United States Patent
Simons et al.

(10) Patent No.: US 6,214,623 B1
(45) Date of Patent: Apr. 10, 2001

(54) TIME-TEMPERATURE INDICATOR DEVICES

(75) Inventors: Michael J. Simons, Eastcote (GB); John A. Weldy, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/176,498

(22) Filed: Oct. 21, 1998

(30) Foreign Application Priority Data

Jan. 20, 1998 (GB) .................................. 9801137

(51) Int. Cl.⁷ ........................................ G01K 3/04
(52) U.S. Cl. ................... 436/2; 436/1; 436/164; 422/61; 116/207
(58) Field of Search .................... 422/58, 61; 436/1, 436/164, 2; 73/61.46, 61.76; 116/206–207

(56) References Cited

U.S. PATENT DOCUMENTS

| | | |
|---|---|---|
| 4,212,153 | 7/1980 | Kydonieus et al. . |
| 4,339,240 * | 7/1982 | Patel ........................................ 422/56 |
| 4,550,676 * | 11/1985 | Francis .................................. 116/206 |
| 5,057,434 | 10/1991 | Prusik et al. . |
| 5,476,792 | 12/1995 | Ezrielev et al. . |

FOREIGN PATENT DOCUMENTS

| | | |
|---|---|---|
| 6-287537 * | 10/1994 | (JP) . |
| 92 09870 | 6/1992 | (WO) . |

OTHER PUBLICATIONS

Shuttleworth and Simons, Research Disclosure, 1976, 142, pp. 14–15).

* cited by examiner

Primary Examiner—Lyle A. Alexander
(74) Attorney, Agent, or Firm—Clyde E. Bailey, Sr.

(57) ABSTRACT

A time-temperature indicator device comprises a polymeric layer having a first and second surface and a dye composition adhered to said first surface comprising a dye which diffuses into the polymeric layer as a result of a cumulative time-temperature exposure wherein the dye is invisible when viewed in visible radiation and is detectable as a result of absorption of non-visible radiation. The device may be attached to a product for monitoring cumulative time-temperature exposure.

13 Claims, 1 Drawing Sheet

TIME-TEMPERATURE INDICATOR DEVICES

FIELD OF THE INVENTION

The invention relates to time-temperature indicator devices.

BACKGROUND OF THE INVENTION

Time-temperature indicator devices provide a way of indicating a cumulative time-temperature exposure. A device may be capable of indicating whether a commodity has been exposed to a temperature greater than a predetermined temperature for a period of time. For example, a device might indicate exposure to an excessive temperature for an excessive time or exposure to an adequate temperature for an adequate time.

Various types of time-temperature indicator devices have been disclosed which rely on the diffusion of a dye through a polymer to provide a visual indication of cumulative time-temperature exposure.

U.S. Pat. No. 4,212,153, issued Jul. 15, 1980, titled "Time Color Indicator," by Kydonieus et al., discloses a time indicator device in which molecular migration of a dye or other agent from one surface of a polymeric indicator layer to the other causes a visible change after a defined time. The indicators exemplified make use of plasticized polyvinyl chloride as the polymeric material. Examples are shown where the rate of appearance of dye colour is accelerated by higher temperatures.

U.S. Pat. No. 5,057,434, issued Oct. 15, 1991, titled "Multifunctional Time-Temperature Indicator," by Prusik et al., describes an integrated time-temperature indicator device comprising a system of printable multilayer compatible compositions including (i) a layer of a first composition (a) which develops a first color change as a result of a cumulative time-temperature exposure; (ii) a composition (b) that is capable of melting at a predetermined temperature; and (iii) a composition (c) capable of producing a second color change only as a result of the melting of composition (b) and wherein said second color change is combined with the first color change to yield an integrated color change result.

U.S. Pat. No. 5,476,792, issued Dec. 19, 1995, titled "Time-Temperature Indicator Devices," by Ezrielev et al., discloses a time-temperature indicator device for recording the duration of time over which a temperature has been established above a predetermined temperature. The device includes a dye-compatible polymer composition having a softening point above the predetermined temperature and a polymer-compatible dye composition in contact with the polymer composition and present in a quantity sufficient for diffusion through the polymer composition whenever it is above the predetermined temperature. The quantity of dye is selected so that the extent of diffusion corresponds to the duration of exposure above the predetermined temperature relative to the total time required for substantially complete diffusion. The devices exemplified are suitable for providing a heat history for medical instruments subjected to high temperature sterilisation.

There is a need for devices which provide an indication of cumulative time-temperature exposure which is not discernible by simple visual inspection. There is a need for devices which can be activated at the point of use without need for appropriate storage before use.

SUMMARY OF THE INVENTION

The present invention is directed to overcoming one or more of the problems set forth above. Briefly summarized, according to one aspect of the present invention, there is provided a time-temperature indicator device comprising a polymeric layer having a first and second surface and a dye composition adhered to said first surface comprising a dye which diffuses into the polymeric layer as a result of a cumulative time-temperature exposure wherein the dye is invisible when viewed in visible radiation and is detectable as a result of absorption of non-visible radiation.

In another aspect, the invention provides a method of forming a time-temperature indicator device comprising forming a layer of polymer on a support and applying to the surface of the layer a dye composition comprising a dye which diffuses into the polymeric layer as a result of a cumulative time-temperature exposure wherein the dye is invisible when viewed in visible radiation and is detectable as a result of absorption of non-visible radiation. A method of monitoring the cumulative time-temperature exposure of a product comprises associating a time-temperature indicator device according to the invention with the product and detecting the degree of dye diffusion over a period of time.

Advantageous Effect of the Invention

The device of the invention has numerous advantages over prior art developments. The device can be used to give a covert warning of exposure of a product to excessive temperature over a period of time. Further, the non-visible marking which appears may be used by a retailer, wholesaler or stock-holder of the product as an early warning that the product is approaching the limit of exposure to the temperature concerned. Moreover, the activation of the device at the point of use avoids the need for appropriate storage before use.

BRIEF DESCRIPTION OF THE DRAWINGS

The above and other aspects, objects, features, and advantages of the present invention will be more clearly understood and appreciated from a review of the following detailed description of the preferred embodiments and appended claims, and by reference to the accompanying drawings, wherein:

DETAILED DESCRIPTION OF THE INVENTION

Figure 1:
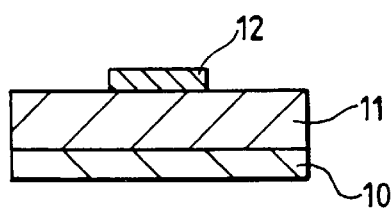
FIG. 1 is a schematic cross section of a device in accordance with the invention.

The invention is characterised in that the dye is invisible when viewed in visible radiation and is detectable as a result of absorption of non-visible radiation.

Preferably, the dye absorbs predominantly ultraviolet or infrared light. Particularly preferred is a dye which fluoresces when exposed to ultraviolet light.

The dye is preferably a water-insoluble dye such as a disperse dye or a solvent dye, and sublimable dyes have been found to be very suitable. Sublimable dyes are dyes which can transfer through the vapour phase at temperatures of less than about 250° C. (and normally 100° C.–200° C.).

Fluorescent dyes which do not absorb visible light may be chosen from coumarins and carbostyril compounds; stilbene derivatives such as benzoxazylstilbenes, stilbene naphthotriazoles, and styrylstilbenes; 1,3-diphenyl-2-pyrazolines; naphthalimides; and aromatic oxazole compounds such as styryl benzoxazoles and styrylnaphthoxazoles.

Examples of suitable U.V. excitable dyes (light emitted shown in parenthesis) include 2,2'-p-Phenylenebis(4-methyl-5-phenyloxazole) (Blue), 7-Amino-4-methyl-2-quinolinol (Blue), 7-Dimethylamino-4-methylcarbostyril (Blue), p-Bis(o-methylstyryl)benzene (Blue), 7-Diethylamino-4-methylcoumarin (Blue), 4,6-Dimethyl-7-ethylaminocoumarin (Blue), 4-Methylumbelliferone (Blue), 7-Amino-4-methylcoumarin (Blue), 7-Dimethylaminocyclopenta[c]coumarin (Blue), 7-Amino-4-trifluoromethylcoumarin (Blue)-4-Methyl-7-(sulfomethylamino)coumarin, sodium salt (Blue), 7-Dimethylamino-4-methylcoumarin (Blue), 4-Methylpiperidino[3,2 g]coumarin (Blue), 1,4-bis(2-cyanostyril)benzene (blue) 2-(2-Hydroxyphenyl)benzoxazole (Green), 2-(2-Tosylaminophenyl-4H-3,1-benzoxazin-4-one (Green), N-methyl-4-methoxynaphthalimide (blue), 5-(4-Dimethylaminobenzylidene) barbituric acid (Red) and alpha-Benzoyl-4-dimethylaminocinnamonitrile (Red).

A fluorescent patch which appears on the device is particularly convenient as it is only necessary to shine an ultraviolet light on the products labelled with the device, and those which have experienced threshold or greater exposure to the designated temperature conditions will show a glowing patch.

The device may comprise a second dye which diffuses into the polymeric layer as a result of a cumulative time-temperature exposure and which is visible when viewed in visible radiation.

The dye is preferably a water-insoluble dye such as a disperse dye or a solvent dye, and sublimable dyes have been found to be very suitable. Sublimable dyes are dyes which can transfer through the vapour phase at temperatures of less than about 250° C. (and normally 100° C.–200° C.). Suitable dyes include those used in existing photographic thermal dye transfer products.

Visible dyes may be chosen from azo dyes, diazo dyes, anthraquinone dyes, carbonyl dyes, polymethine dyes, azomethine dyes, triarylmethane dyes, indoaniline dyes, indophenol dyes, xanthine dyes, oxazine dyes and thiazine dyes.

Examples of suitable dyes include dyes known in The Colour Index as solvent dyes, for instance Solvent Green 3 and Solvent Blue 59; dyes known in The Colour Index as oil dyes, for instance Oil Red O; and dyes known in The Colour Index as disperse dyes, for instance Disperse Blue 3, and Disperse Orange 13.

Examples of suitable sublimable dyes include the dyes of Example 1 below; anthraquinone dyes, e.g., Sumikalon™ Violet RS (product of Sumitomo Chemical Co., Ltd.). Dianix™ Fast Violet 3R-FS (product of Mitsubishi Chemical Industries, Ltd.). and Kayalon™ Polyol Brilliant Blue N-BGM and KST Black™ 146 (products of Nippon Kayaku Co., Ltd.); azo dyes such as Kayalon™ Polyol Brilliant Blue BM, Kayalon™ Polyol Dark Blue 2BM and KST Black™ KR (products of Nippon Kayaku Co., Ltd.), Sumickaron™ Diazo Black 5G (product of Mitsui Toatsu Chemicals, Inc.); direct dyes such as Direct Dark Green B™ (product of Mitsubishi Chemical Industries, Ltd.) and Direct Brown M™ and Direct Fast Black D™ (products of Nippon Kayaku Co. Ltd.); acid dyes such as Kayanol™ Milling Cyanine 5R (product of Nippon Kayaku Co. Ltd.); basic dyes such as Sumicacryl™ Blue 6G (product of Sumitomo Chemical Co., Ltd.), and Aizen Malachite Green (E) (product of Hodogaya Chemical Co., Ltd.).

Preferably, the visible dye provides a visible marking which appears after a greater time-temperature exposure than the non-visible marking. This marking would be visible to the purchaser or consumer of a product to which the device is attached, indicating that the product had been exposed to excessive time-temperature conditions. The non-visible marking which appears earlier may be used by the retailer, wholesaler or stock-holder of the product as an early warning that the product is approaching the limit of exposure to the timetemperature conditions concerned.

The visible dye may be chosen so that the rate of diffusion of the visible dye through the polymer is less than that of the invisible dye.

Alternatively, the visible dye may be positioned in the device so that it has a longer diffusion path than the invisible dye.

Preferably, combinations of polymer and dye are selected such that the dye only migrates above a predetermined temperature.

Any of the methods of time-temperature labelling known in the art may be used.

Suitable polymeric layers through which the dye diffuses include cellulose derivatives such as ethyl cellulose, cellulose acetate, cellulose propionate, cellulose acetate butyrate; polyvinyl butyral; polystyrene; polyvinyl chloride; polyvinyl acetate; and polyurethanes. A plasticiser, such as di-n-butyl phthalate or tricresylphosphate, may be added to enhance the diffusion of the dye through the polymeric layer.

Preferably, the polymeric layer through which the dye diffuses comprises a natural or synthetic rubber polymer or copolymer.

The natural or synthetic rubber polymer or copolymer may comprise polymerised diene units selected from butadiene, isoprene and chloroprene.

Suitable polymers and copolymers include vinyl addition compounds including butadiene-styrene copolymers (SBR), acrylonitrile-butadiene copolymers (nitrile rubber), ethylene-propylene-diene (EPDM) rubbers, synthetic polyisoprenes, butyl rubber (copolymers of isobutylene and isoprene), polychloroprene (neoprene), and acrylonitrile and polyacrylate rubbers, or nonvinyl rubbers such as polyurethane rubbers.

The rubbery polymers or copolymers may be used in the unvulcanised or vulcanised (crosslinked) states, and the polymeric layer may be prepared from a latex suspension of the polymer or copolymer. Generally, the rubbery polymers or copolymers of the invention will have a degree of elasticity.

The polymeric layer is critical in determining the temperature range in which the device operates. Rubbers are particularly effective in the lower temperature ranges, for instance latex rubber, as a sheet or as a layer on a support, allows rapid lateral diffusion at room temperature but not at −20° C. Polybutadiene has been found suitable for even lower temperature ranges, polyisoprene (cis) behaves similarly to natural latex rubber, while polyisoprene (trans) is suitable for photographic film temperature indication as a dye mark remains legible for weeks at room temperature but is blurred within 3 hours at 50° C. or 60° C. Copolymers and modified copolymers of styrene and butadiene are suitable for different temperature ranges, depending amongst other things on the styrene:butadiene ratio, higher proportions of styrene requiring higher temperatures before dye diffusion can occur. It is an advantage of the invention that a ready means of altering the time-temperature response of the rubber copolymers is available by adjusting the ratio of monomers from which they are prepared.

Blends of different rubbery polymers or copolymers may allow further control of the thermal diffusion properties.

Preferably, the polymeric layer through which the dye diffuses is non-adhesive.

The polymeric layer may contain additives known in the art, including plasticisers, if desired. It may also contain a substance which melts at a suitable temperature.

In a preferred embodiment of the invention, the polymeric layer contains a masking agent. Examples of suitable masking agents include inorganic pigments e.g. titanium dioxide, zinc oxide, micaceous pigments, aluminium flakes and organic light-scattering agents such as Ropaque™ dispersions manufactured by Rohm & Haas. In this way, the dye can be obscured and does not become detectable until it has migrated through the polymer layer.

The second surface of the polymeric layer may be attached to a support. The support is preferably a planar support e.g. in the form of a sheet or film. Suitable support materials include polymeric materials such as polyesters, polycarbonates, polyethylene, polypropylene and cellophane. The support is preferably transparent.

A preferred time-temperature indicator device may be formed by coating a layer of an aqueous emulsion of a natural or synthetic rubber polymer or copolymer on a support, drying the layer and applying to the surface of the layer one or more dye compositions as described above.

Diffusion of the dye or dyes into the polymer causes a detectable change and the cumulative time-temperature exposure of a product may be monitored by associating a time-temperature indicator device according to the invention with the product and detecting the degree of dye diffusion over a period of time. The degree of dye diffusion may be detected by visual comparison or by known instrument means for comparing dye densities.

The device may be distinct from the product and attached thereto. For example, it may comprise a label having a polymeric layer to which is applied a mark in dye, the combination of polymeric layer and dye being such that the mark suffers diffusion when held above a certain temperature for a certain time, thus causing a change in its appearance when detected. The mark (for instance a date) can for instance be applied to the surface of the label, and excessive timetemperature conditions cause lateral diffusion so it becomes blurred or illegible.

In a preferred embodiment, the polymeric layer is loaded with an obscuring pigment, such as titanium dioxide, a warning message in dye is applied to one side of the polymeric layer, and the time-temperature condition causes the dye to diffuse through the thickness of the layer so that it becomes detectable from the other side.

The label may be attached to the commodity which it is monitoring. A preferred form of label comprises a pigmented rubbery layer coated on a transparent support, the dye is applied in the absence of a solvent for the dye to the side of the pigmented rubbery layer furthest from the transparent support, and the label is attached so that the pigmented rubbery layer is viewed through the transparent support. In this way, the dye only becomes detectable after diffusing through the pigmented rubbery layer following exposure to temperature and time conditions sufficient to cause the diffusion.

An example of such a label is shown schematically in cross section in FIG. 1. A layer of rubber copolymer 11 containing a masking agent to render it opaque is carried on a transparent polyester film support 10. The outer surface of the rubber copolymer 11 bears a dye mark 12. The label may be provided with adhesive on the outer surface of the rubbery layer to facilitate attachment to the product. The adhesive e.g. in the form of an adhesive layer, may be covered by a release sheet which would be removed prior to use. The dye may be applied directly to the surface of the pigmented rubbery layer, either as an aqueous "ink" or dispersion of finely divided solid particles, or by the method of flash transfer (as described by Shuttleworth and Simons in Research Disclosure, 1976, 142, pp14–15) if the dye is sublimable.

Alternatively the dye may be applied to a separate carrier sheet by printing or stamping, and, after any solvents for the dye have been allowed to disperse, the pigmented polymeric layer is contacted to the carrier sheet with a rubbery adhesive layer which readily allows the dye to diffuse through it in the temperature regime being monitored.

Figure 2:
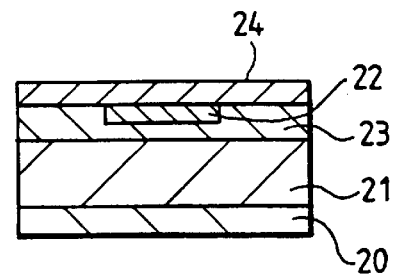
FIG. 2 is a schematic cross section of a device in accordance with the invention.

An example of such a label is shown schematically in cross section in FIG. 2. A layer of rubber copolymer 21 containing a masking agent to render it opaque is carried on a transparent polyester film support 20. The outer surface of layer 21 is covered by a layer of adhesive 23 which will allow dye to diffuse therethrough in use e.g. a rubbery adhesive layer. The outer surface of the adhesive layer is in contact with a paper support 24 bearing a dye mark 22.

In a further embodiment, the dye may be dissolved or dispersed in an aqueous latex dispersion of diffusion-permitting rubbery polymer and the rubber-dye composition used as an ink to print the required warning message or sign, either on the back surface of the label itself, or on the separate carrier sheet to which the back surface of the label is subsequently contacted.

It will be appreciated that the time-temperature indicator device may be an integral part of the product. For example, the dye may be applied to the product e.g. printed on the packaging, and simultaneously or subsequently covered with a layer of the polymer. In this way the dye and polymer can be kept separate until required to fulfil their function in combination and the device is formed at the point of use. In comparison, a device formed prior to use has to be kept under conditions which ensure that there is no premature dye migration until use occurs.

An alternative embodiment of the invention is a device which gives assurance to the user or merchandiser that the product is still good by displaying a message or mark which disappears when exposed to excessive conditions of time and temperature. The message or mark may be a printed word or words, such as "FRESH", or it may be an encoded message such as a bar code which is optoelectronically scanned. The message or mark is caused to disappear or become unreadable by the growth of dye density in the areas surrounding the message or mark, so that it can no longer be read or scanned.

In a further embodiment of the invention, the disappearance of the first message or mark, e.g. in invisible dye, may be followed by the appearance of a second message or mark, e.g. in visible dye, which gives a positive indication that excessive conditions of time and temperature have been experienced, for instance by the appearance of a warning message, such as "EXPIRED." This second message or mark may be made by a dye which appears at a slower rate than the dye which causes the obscuring of the first message or mark.

Figure 3A:
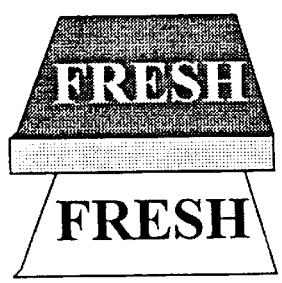
FIGS. 3A and 3B are schematic illustrations of the use of a device in accordance with the invention.
Figure 3B:

In the case of an eye-readable message, the device may be fabricated by printing the message on a viewable surface and printing the same message in a negative sense in or below the time-temperature responsive medium, so that when the time-temperature responsive medium has fully responded to the exposure to temperature over time, the negatively-printed message has appeared to give a substantially uniform dye density in the area of the message. This is illustrated in FIGS. 3A and 3B which depict the use of devices based on dye diffusion through a polymer in accordance with the invention. The message "FRESH" is printed on the viewable surface, either in the negative sense (FIG. 3A), or in the positive sense (FIG. 3B). The same message is printed in the opposite sense on a lower surface. The ink used comprises a diffusible dye, and between this message and the viewable surface is applied a layer of pigment-filled rubbery polymer which obscures the message on the lower surface. When the device is maintained at a temperature to which it responds, the diffusible dye diffuses through the polymer and eventually gives an equal and opposite density at the viewable surface such that the message can no longer be read.

Figure 4:
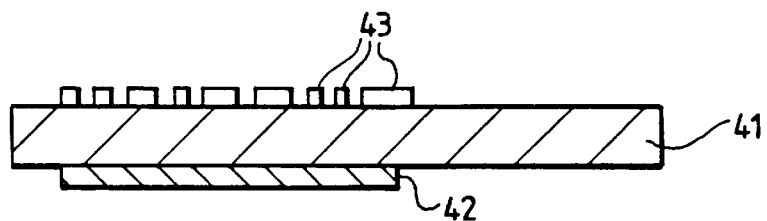
FIG. 4 is a schematic cross section of a device in accordance with the invention.

In the case of a machine-read mark, such as a bar code, the device may be fabricated by printing the mark or bar code on a viewable surface and providing the means for a uniform growth of dye density at the viewable surface of the time-temperature responsive medium, so that when the time-temperature responsive medium has fully responded to the exposure to temperature over time, the contrast of the mark or bar code has been decreased sufficiently to make it unreadable by the machine. This is illustrated in FIG. 4, which depicts the use of a device based on dye diffusion through a polymer in accordance with the invention. A bar code 43 is printed in dye on the viewable surface of a pigment-filled rubbery polymer layer 41. The pigment-filled rubbery polymer layer is applied or printed above a layer or patch 42 of diffusible dye which absorbs light in wavelengths to which the optoelectronic reading or scanning device is sensitive. When the device is exposed to a temperature above the critical point, the diffusible dye starts to diffuse and when sufficient time has elapsed, the resultant dye density produced in the background against which the bar code is printed causes the bar code to become unreadable.

The sensitivity of the system is controlled primarily by the polymeric layer, but the precise nature of the dye also has an effect, depending on the polymeric layer used. The sensitivity may also be controlled (or fine-tuned) by the dimensions of the mark, as a difference will be detected earlier if the spacing between elements of the mark is smaller rather than larger, since less diffusion is required to change the appearance of the mark. Patterns of dots may be particularly sensitive.

Labels according to the invention may be used for refrigerated or frozen food, to show if it has been kept for a period at higher than desirable temperatures, or for example for photographic materials e.g. film, paper and photoprocessing solutions which deteriorate if kept at unduly high temperatures. The choice of polymer and dye determines the temperature-time regime in which the label operates.

It is a particularly useful feature of the invention that for low temperature regimes, the mark may be applied at the point and time of use. Hence, there is no need to store the temperature-time indicator at low temperatures prior to use. Further, our experience indicates that the temperature-time indicator devices of the invention are not particularly sensitive and they have a long shelf life at room temperature.

In another application, the device may be used to verify that a sufficient heat treatment (e.g. cooking) has been given. In this case, it may be preferable to arrange the device so that the dye diffuses through the thickness of a pigmented polymeric layer so that a detectable mark or message (e.g. COOKED) appears on its top surface when the required time-temperature conditions have been met.

There is a very large potential market for labels to warn against improper thermal storage conditions, such potential markets being photographic materials, foodstuffs, pharmaceuticals, and vaccines and batteries.

The invention is further illustrated by way of example as follows.

EXAMPLE 1

Titanium dioxide dispersion:

Titanium dioxide ("Tioxide R-CR2"), 60 g, water, 75 g, and 10 wt % sodium tri-isopropyl naphthalene sulphonate solution in water, 1 g, were put in a glass jar together with about 100 g of 5 mm diameter glass beads and the mixture was ball-milled overnight. The result was a smooth white dispersion.

Coating:

6 g of the titanium dioxide dispersion was mixed with 2 g of water plus 10 g of a latex of a carboxylated styrene/butadiene copolymer, type DL395 supplied by Dow Chemical Company. The latex had 50 wt % solids and the glass transition temperature (Tg) was stated to be 10° C.

The white suspension was coated on polyester film base using a doctor blade spaced approximately 75 micrometers above the film base, and allowed to dry. The result was a smooth opaque white coating.

Flash transfer printing:

Coatings of a sublimable fluorescent dye with carbon in an ethyl cellulose binder were prepared by dissolving 0.1 g of dye and 0.2 g of ethyl cellulose in 10 ml of 4-methyl-2-pentanone, adding 10 ml of lampblack dispersion and 3 drops of 2% w/w polydimethylsiloxane solution in toluene, and coating on polyester film base with a knife blade set 0.1 mm above the film base. The lampblack dispersion was prepared by dissolving 0.8 g of ethyl cellulose in 50 ml of 4-methyl-2-pentanone, adding 2.0 g of lampblack, and ball-milling (using 5 mm diameter glass balls) overnight. The dye used was 7-diethylamino-4-methylcoumarin, supplied by Aldrich.

The coating was placed face down on the coated white layer described above, an optical mask showing a printed message in clear figures on a black ground was placed above the coating and under the window of a photographic flash gun. The gun was fired and, on illumination with ultraviolet light it was seen that a pattern of dye corresponding to the printed message had transferred to the coated white layer.

The coated white layer was then put in an oven at 60° C. for one hour, and then removed. The side opposite to that to which the printed message had been applied was examined under room lighting: nothing was visible other than the uniform white coloration. It was then examined under ultraviolet light from an ultraviolet fluorescent tube, and the message was clearly seen in a bright blue colour. A similar strip was maintained at room temperature (21° C.) for six days: on examination under ultraviolet light, the printed message was clearly seen in a bright blue colour on the side to which it was initially applied, but was not visible at all on the opposite side.

EXAMPLE 2

This Example illustrates an alternative way to apply diffusible fluorescent dye.

A dispersion of the fluorescent dye was made in a latex of lower glass transition temperature by dissolving 0.05 g of the dye of Example 1 in 1.5 ml of acetone, adding this solution to 5.0 g of a latex of a carboxylated styrene/butadiene copolymer, type XZ94466.01 supplied by Dow Chemical Company. The latex had 49 wt % solids and the glass transition temperature (Tg) was stated to be −35° C. The mixture was stirred for 20 minutes then coated on polyester film base at 0.15 mm wet thickness and allowed to dry.

When dry, a small piece of the resulting sticky coating was pressed firmly against a portion of the white coated layer described in Example 1. On examination under ultraviolet light, the applied piece of sticky coating glowed bright blue, but nothing could be seen from the opposite side of the white coated layer. The assembly was then put in an oven at 60° C. for one hour, and then removed. The side opposite to that to which the sticky coating had been applied was examined under room lighting: nothing was visible other than the uniform white coloration. It was then examined under ultraviolet light from an ultraviolet fluorescent tube, and the shape of the applied sticky coating was clearly seen as a bright blue patch. A similar strip was maintained at room temperature (21° C.) for six days: on examination under ultraviolet light, the applied sticky patch was clearly seen in a bright blue colour on the side to which it was initially applied, but was not visible at all on the opposite side.

EXAMPLE 3

This example illustrates the preparation of a two-stage device.

A dispersion of a visible dye was made in the latex used in the white coated layer of Example 1 by dissolving 0.05 g of the dye Solvent Green 3 in 1.5 ml of acetone, adding this solution to 5.0 g of a latex of a carboxylated styrene/butadiene copolymer, type DL395 supplied by Dow Chemical Company. The latex had 50 wt % solids and the glass transition temperature (Tg) was stated to be 10° C. The mixture was stirred for 20 minutes then marks were made by applying the liquid with a fine brush to polyester film base. When the marks had dried, a layer of fluorescent dye dispersed in the lower glass transition temperature latex was coated on top of the marks using the formulation and method of Example 2.

When dry, a small piece the resulting sticky coating was pressed firmly against a portion of the white coated layer described in Example 1. On examination under ultraviolet light, the applied piece of sticky coating glowed bright blue, and the marks in green dye could be seen against the glowing blue colour, but nothing could be seen from the opposite side of the white coated layer. The assembly was then put in an oven at 60° C. for one hour, and then removed. The viewing side, that is the side opposite to that to which the sticky coating had been applied, was examined under room lighting: nothing was visible other than the uniform white coloration. It was then examined under ultraviolet light from an ultraviolet fluorescent tube, and the shape of the applied sticky coating was clearly seen as a bright blue patch. The fluorescence was less where the marks in green dye had been applied, but the green dye marks were not visible from the viewing side in room light. After 3 hours at 60° C., the fluorescent patch was clearly visible, and also the marks in green dye were weakly visible on the viewing side, and after 6 hours at 60° C. both the fluorescent patch and the green dye marks were clearly visible on the viewing side when viewed under ultraviolet and visible light respectively.

The invention has been described in detail with particular reference to certain preferred embodiments thereof, but it will be understood that variations and modifications can be effected within the spirit and scope of the invention.

PARTS LIST 10. transparent polyester film support
11. layer of rubber copolymer
12. dye mark
20. transparent polyester film support
21. layer of rubber copolymer
22. dye mark
23. adhesive
24. paper support
41. pigment-filled rubbery polymer layer
42. layer or patch
43. bar code

What is claimed is:

1. A time-temperature indicator device comprising a polymeric layer having a first and second surface and a dye composition adhered to said first surface comprising a dye which diffuses into the polymeric layer as a result of a cumulative time-temperature exposure wherein the dye is invisible when viewed in visible radiation and is detectable as a result of absorption of nonvisible radiation.

2. A device according to claim 1 wherein the dye absorbs predominantly ultraviolet or infrared light.

3. A device according to claim 1 wherein the dye fluoresces when exposed to ultraviolet light.

4. A device according to claim 1 wherein the dye is selected from the group consisting of coumarins and carbostyril compounds; stilbene derivatives; 1,3-diphenyl-2-pyrazolines; naphthalimides; and aromatic oxazole compounds wherein the dye is invisible when viewed in visible radiation and is detectable as a result of absorption of non-visible radiation.

5. A device according to claim 1 comprising a second dye which diffuses into the polymeric layer as a result of a cumulative time-temperature exposure wherein the dye is visible when viewed in visible radiation.

6. A device according to claim 1 the polymeric layer contains a masking agent.

7. A device according to any claim 1 wherein the polymer or copolymer comprises polymerised diene units selected from butadiene, isoprene and chloroprene.

8. A device according to claim 7 wherein the polymer or copolymer is selected from the group consisting of butadiene-styrene rubbers, acrylonitrile-butadiene rubbers, polyacrylonitrile rubbers, ethylene-propylenediene rubbers, polyisoprene rubbers, isobutylene-isoprene rubbers, styreneisoprene rubbers, polyacrylate rubbers and polyurethane rubbers.

9. A device according to claim 1 wherein the second surface of the polymeric layer is attached to a support.

10. A device according to claim 7 wherein the support is transparent.

11. A method of forming a time-temperature indicator device comprising forming a layer of polymer on a support and applying to the surface of the layer a dye composition comprising a dye which diffuses into the polymeric layer as a result of a cumulative time-temperature exposure wherein the dye is invisible when viewed in visible radiation and is detectable as a result of absorption of non-visible radiation.

12. A method of monitoring the cumulative time-temperature exposure of a product which comprises associating a time-temperature indicator device according to claim 1 with the product and detecting the degree of dye diffusion over a period of time.

13. A method according to claim 12 wherein the time-temperature indicator device is an integral part of the product.

* * * * *